Jan. 26, 1954 W. F. LAPINSKI ET AL 2,667,367

TELEPHONE AND MEMORANDUM PAPER HOLDER

Filed Oct. 21, 1950 3 Sheets-Sheet 1

INVENTORS
Walter F. Lapinski
Joseph L. Scott

BY James E. Spiroll

ATTORNEY.

Jan. 26, 1954 W. F. LAPINSKI ET AL 2,667,367

TELEPHONE AND MEMORANDUM PAPER HOLDER

Filed Oct. 21, 1950 3 Sheets-Sheet 2

INVENTORS
Walter F. Lapinski
Joseph L. Scott
BY James E. Sproll
ATTORNEY.

INVENTORS
Walter F. Lapinski
Joseph L. Scott
BY James E. Sproll
ATTORNEY

Patented Jan. 26, 1954

2,667,367

UNITED STATES PATENT OFFICE 2,667,367

TELEPHONE AND MEMORANDUM PAPER HOLDER

Walter F. Lapinski and Joseph L. Scott, Seattle, Wash.

Application October 21, 1950, Serial No. 191,344

6 Claims. (Cl. 281—6)

This invention relates to improvements in telephone and memorandum paper holders.

The primary aim and fundamental object of the present invention is to provide a novel and improved sectional telephone and memorandum paper holder especially designed and particularly adapted to receive and accommodate desk type telephone instruments having bases of all shapes and sizes.

Another principal aim and object of the invention is to provide a sectional telephone and memorandum paper holder wherewith telephone holding sections of different shapes and sizes may be selectively assembled and/or employed to receive and accommodate desk type telephone instruments or sets having bases of any shape or size.

A further important aim and object of the invention is the provision of a telephone and memorandum paper holder, the telephone holding section of which may be rapidly and readily interchanged with and replaced by another telephone holding section to receive and accommodate a desk type telephone instrument having a base of different shape and size.

A still further general aim and object of the invention is to provide a sectional telephone and memorandum paper holder, the sections of which may be rapidly and readily assembled and similarly disassembled.

A still further general aim and object of the invention is to provide a sectional telephone and memorandum paper holder wherein a desk type telephone instrument may be rapidly and readily seated and similarly removed therefrom.

A still further general aim and object of the invention is to provide a sectional telephone and memorandum paper holder which may be rapidly and readily replenished with a fresh roll of memo paper by merely removing therefrom the paper holding section of the same.

The improved results, brought about by the practice of the instant invention, are, therefore, mainly effected and primarily secured by employing interchangeable and replaceable telephone holding sections with the present sectional telephone and memorandum paper holder, so that all shapes and sizes of desk type telephone instrument bases may be readily accommodated thereby, and in addition thereto such holder furnishes and makes immediately available, in propinquity to the telephone instrument, a readily accessible writing surface for business and social memoranda.

The above and additional objects which will hereinafter be more specifically treated are attained by such means as are shown in the accompanying drawings, described in the following specification and then more clearly pointed out in the claims, which are appended hereto and form a part of this application.

With reference to the drawings, wherein are illustrated two embodiments of the invention, and throughout the several views thereof like characters of reference designate similar parts:

Figure 1 is a side elevation of the telephone and memorandum paper holder comprehended by the present invention;

Figs. 2 and 3 are transverse vertical sections of the same taken on the lines 2—2 and 3—3, respectively, of Fig. 1;

Figs. 4, 5 and 6 are fragmentary vertical longitudinal sections taken on the lines 4—4, 5—5 and 6—6, respectively, of Fig. 3;

Fig. 7 is a transverse vertical section of the holder taken on the line 7—7 of Fig. 1;

Figs. 8 and 9 are fragmentary vertical longitudinal sections taken on the lines 8—8 and 9—9, respectively, of Fig. 7;

Figures 1, 5, 6:
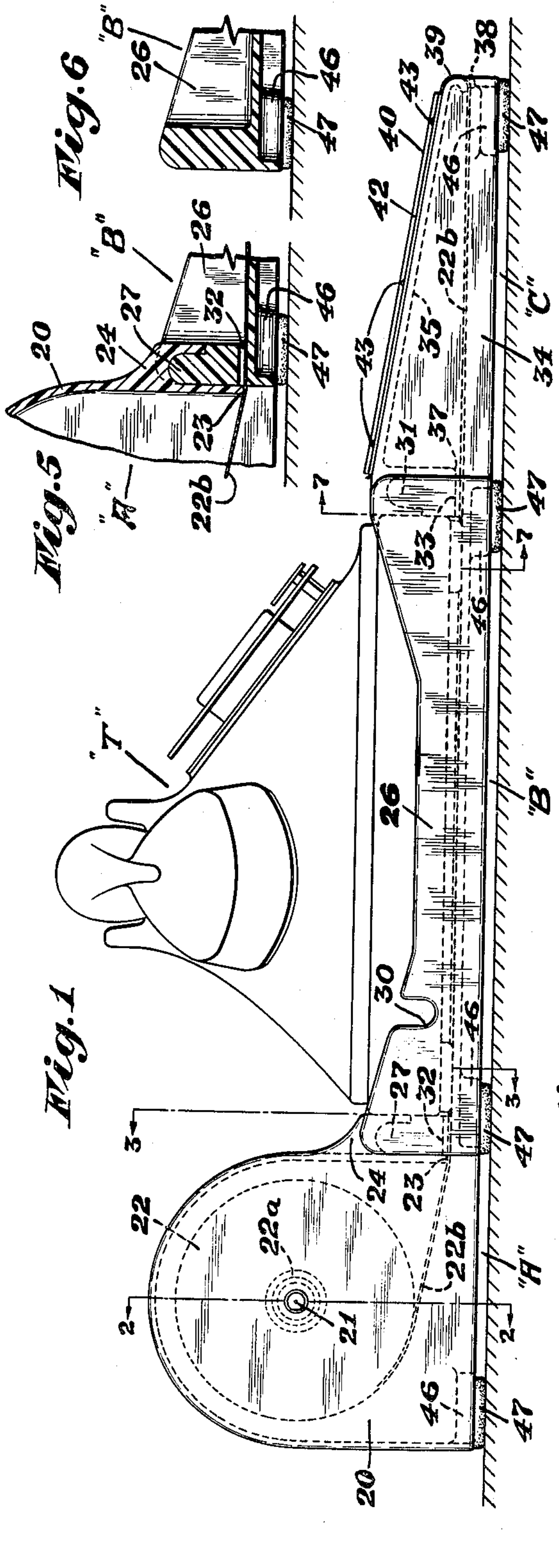
Figures 2, 3, 4:
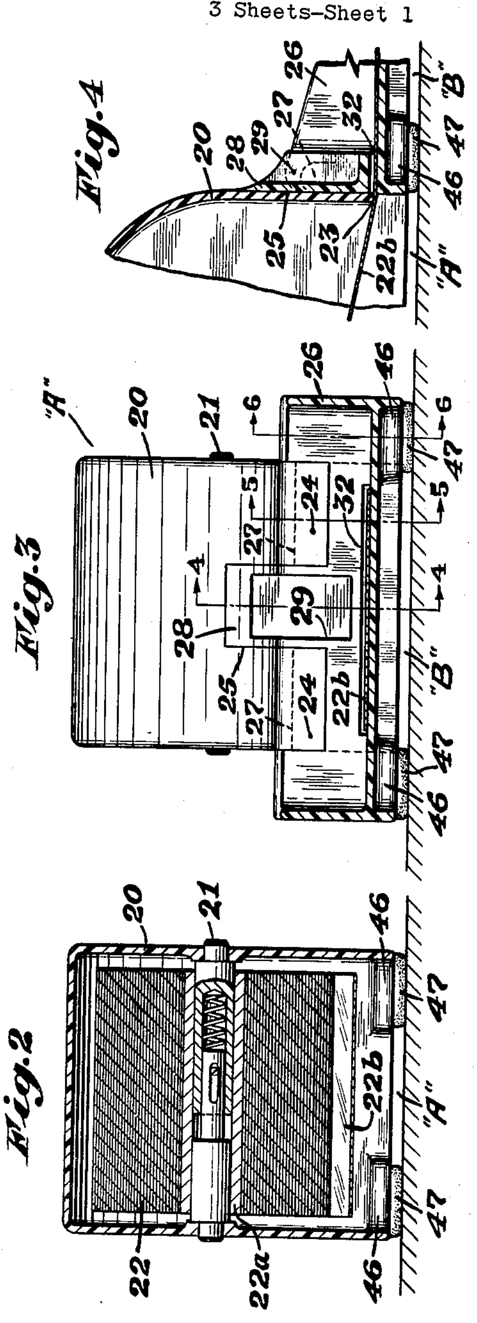

Before taking up the detailed description of the several embodiments of the telephone and memorandum paper holders herein disclosed, it should be here stated that, the sections of these holders are preferably, although not necessarily, molded or otherwise formed from suitable and appropriately colored plastic materials; or may, if desired and found expedient, be fabricated from a light cast metal, such as aluminum, pot metal, or the like; and/or may be die-stamped from aluminum sheet, light sheet steel, or any other suitable sheet material.

Referring now to the accompanying drawings for a detailed description of the same and more particularly to Figs. 1 to 11, inclusive, wherein the reference characters A, B and C designate, respectively, a memo paper roll holding section, a telephone holding section, and a tablet or writing section of the present sectional telephone and memorandum paper holder, which sections, as now contemplated, are preferably arranged and normally disposed in longitudinally aligned and releasably engaged relation, as and in the manner shown in the aforesaid drawings and as hereinafter more fully described.

The memo paper roll holding section A essentially consists of a casing or housing 20 having a closed semi-circular upper end and an open lower end. Medially journalled or rotatively mounted at its shouldered terminals within the end walls of the casing 20 is a transversely disposed arbor 21, of the well known sectional spring-pressed type, upon which is mounted a roll of memorandum paper 22 having the conventional or usual tubular wooden core 22*a*. The inner side wall of the casing 20 is transversely undercut, as at 23, for the passage thereunder and from said casing of the memo paper strip 22*b* as the latter is unwound or withdrawn from the roll 22. The strip 22*b* is appropriately and suitably tensioned, in any well known manner and by any suitable means, not shown, during unwinding or withdrawal of same from its roll 22.

For a purpose shortly to be described, the inner side wall of the casing 20 is provided, exteriorly thereof, with transversely disposed saddle lugs 24, which lugs may be integrally formed or otherwise rigidly secured to said side wall in endwise spaced relation to thereby form and provide therebetween a centrally disposed recess 25, the function of which will hereinafter be made more apparent.

The telephone holding section B essentially consists of a rectangular tray 26, wherein the rectangular base of a telephone instrument or set generally designated herein by the reference character T is adapted to normally seat, substantially as and in the manner shown in Fig. 1. Formed and provided upon one end of the telephone holding tray 26 in spaced endwise relation are transversely disposed ribs 27 having semi-circular upper edges, which ribs are normally adapted to be straddled by and interlocked with the saddle lugs 24 of the memo paper roll holding section A, as and in the manner shown more clearly in Fig. 5. Also formed and provided upon the same end of the telephone holding tray 26, intermediate the ribs 27 of same, is a centrally disposed and upwardly extending arcuately shaped lug 28 having a recess formed therein, which lug is adapted to normally fit and seat within the recess 25 of the section A, when the latter is assembled with the section B, as more clearly shown in Figs. 3 and 4, to thereby retain the section A against lateral dislodgement or sidewise movement relative to the section B, while, the recess 29 of the lug 28 is provided to furnish accommodation and clearance for the incoming-outgoing telephone cord, not shown, which cord normally enters the rear end of the telephone base in a well known manner. To accommodate and furnish clearance for the telephone cord, not shown, which normally extends from the side of the telephone base to the receiving-transmitting unit of the telephone T, a notch 30 is formed and provided in one side of the telephone holding tray 26 adjacent the end of same having the ribs 27 and lug 28, see Figs. 1 and 11.

Formed and provided upon the opposite end of the telephone holding tray 26, for a purpose shortly to be described, is a centrally and transversely disposed rib 31 having a semi-circular upper edge.

To effect and permit passage of the memo paper strip 22*b* from end to end of the telephone holding tray 26, the end walls of the latter are provided, at or near the bottom wall of same, with medially and transversely disposed slots 32 and 33, respectively, so that said memo paper strip 22*b* may readily pass between the padded bottom face of the telephone base and the upper face of the bottom wall of the tray 26, whereon said strip rests during its passage therethrough between the corner pads of the telephone base, as shown more clearly in Figs. 1, 3, 5, 7 and 8.

Figures 7, 8, 9, 10, 11:
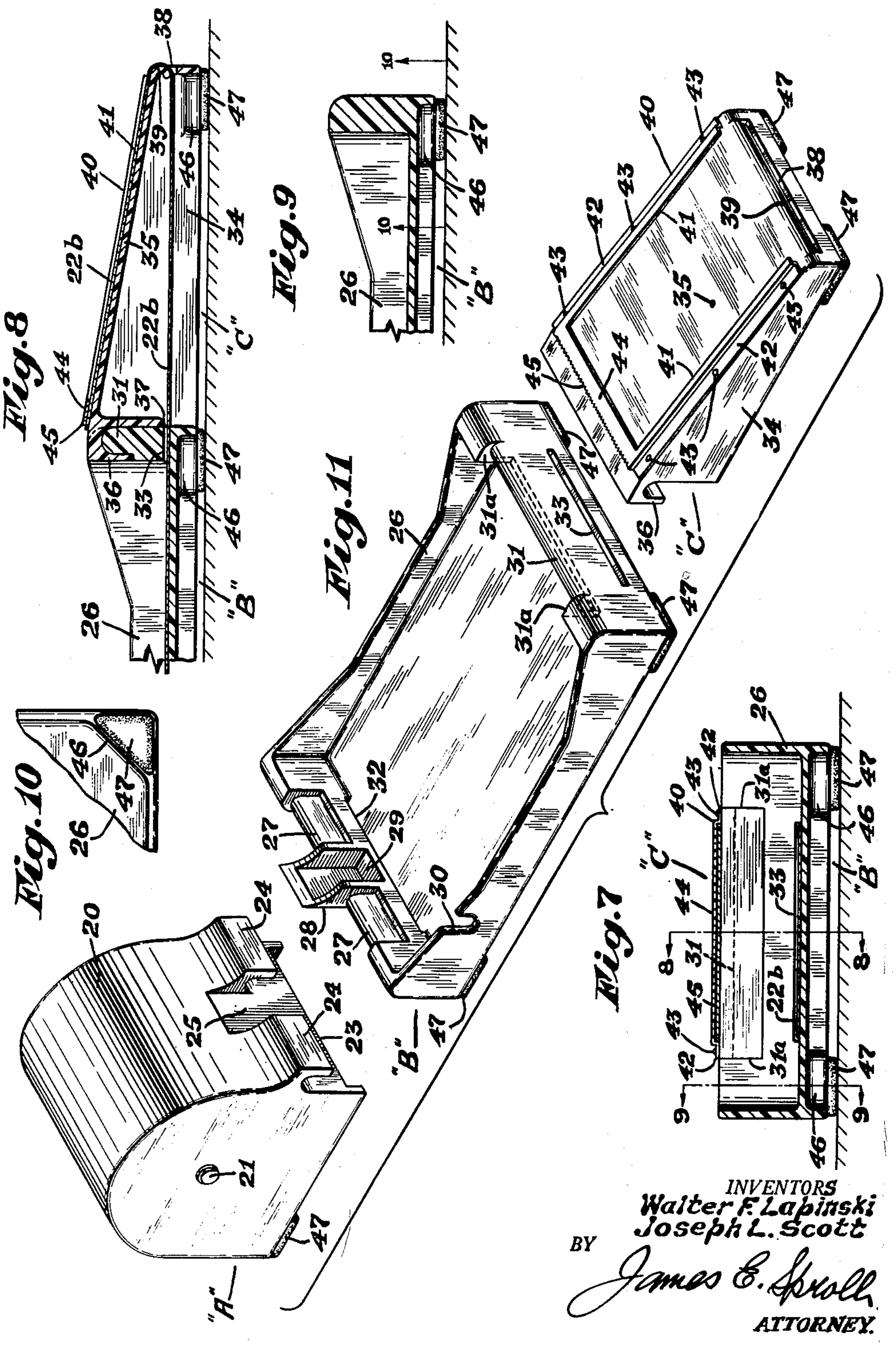
Fig. 10 is a fragmentary inverted plan view of the telephone holding section, such view being taken on the line 10—10 of Fig. 9.
Fig. 11 is an exploded view in perspective of the present sectional telephone and memorandum paper holder, illustrating more clearly the several sections comprising the same.

The tablet or writing section C essentially consists of a casing 34, the inwardly and upwardly sloping upper wall of which forms and constitutes an inclined platen or writing surface 35, while its inner end wall is provided, exteriorly thereof, with a transversely disposed saddle lug 36 integrally formed thereon or otherwise rigidly secured thereto, which saddle lug is normally adapted to straddle and interlock with the rib 31 of the telephone holding section B, as and in the manner shown more clearly in Fig. 8, and when thus interlocked with the rib 31 said saddle lug 36 snugly fits between the rib shoulders 31*a*, see Fig. 7, to thereby effectually prevent lateral or sidewise movement of the section C relative to the section B, as will be readily understood.

To provide clearance for the passage thereunder of the memo paper strip 22*b*, the inner end wall of the casing 34 is transversely undercut, as at 37, see Fig. 8, while, the outer end wall of said casing 34 is provided with a transversely disposed slot 38 for the passage therethrough of the memo paper strip 22*b*, said slot 38, in the present instance, having its upper edge curved upwardly and inwardly, in substantially semi-circular formation, to merge with the upper face of the platen 25, and thus provide thereat, see Figs. 8 and 11, an arcuate surface 39 around which the memo paper strip 22*b* is return-bent to pass thereover and from thence to extend upwardly and inwardly therefrom to cover and rest upon said platen 35, as and in the manner shown more clearly in Fig. 8.

The memo paper strip 22*b* is maintained in medially aligned relation upon the platen 35 by an inverted U-shaped retaining member 40, the upwardly and inwardly extending side legs of which, in part, overlap or overlie the marginal side portions of the memo paper strip 22*b* and accordingly are upwardly offset and conjointly with the upper face of the platen 35 form and constitute longitudinal guideways 41 for said marginal side portions of the strip 22*b*, as will be readily apparent and understood by referring more particularly to Fig. 11. The non-upset side leg portions of the member 40 form and provide flanges 42 which are fixedly secured, as by rivets 43 or the like, to the marginal side portions of the platen 35, see Figs. 1 and 11.

The transversely disposed leg or portion 44 at the inner upper end of the retaining member 40 is disposed in the plane of the upwardly offset portions of the side legs of said member 40 forming the guideways 41, so that the memo paper strip 22*b* may and will readily pass therebeneath and in order that memos or notes may be rapidly and readily cut or severed from the memo paper strip 22*b*, as and when desired or upon completion of same, the portion 44 is provided with a serrated outer edge 45, as shown more clearly in Figs. 7 and 11.

To effectually prevent injury to or marring of desk tops or other supporting surfaces by the present telephone and memorandum paper holder, the undersides of the sections A, B and C are provided, see Fig. 10, with triangularly shaped corner bosses 46 having similarly shaped pads 47 of rubber, felt, or other suitable material, which are bonded, cemented, or otherwise fixedly secured thereto, such bosses and pads, in the present instance, being located at the outer end corners of the casing 20 of the memo paper roll holding sections A; are also located at each corner of the tray 26 of the telephone holding section B, and are also located at the outer end corners of the casing 34 of the tablet or writing section C, as will be readily apparent by referring more particularly to Figs. 1 and 11.

To prepare the telephone and memorandum paper holder for initial use, or when replenishing the same with a fresh roll of memo paper 22, the memo paper roll holding section A is detached from the telephone holding section B and is inverted to effect removal therefrom of the sectional arbor 21, which is accomplished by pressing inwardly upon the end of either one of the spring-pressed sections of same to thus unseat said arbor from its journals; following which the freed arbor is passed through the tubular wooden core 22a of the initiating or the replenishing roll of memo paper 22, after which the arbor 21 with its roll of memo paper 22 is inserted within the casing 20 for reseating the shouldered terminals of said arbor in its journals, and thus effect operative positioning of said roll of memo paper within the section A, which latter is then reinverted and the initial unwinding or withdrawal of the memo paper strip 22b from the roll 22 is effected, so that the free terminal of such withdrawn strip may be threaded through the end slot 32 of the tray 26 and from thence passed over the bottom wall of the latter for threading through the slot 33 in the opposite end of said tray, thence lengthwise through the casing 34 of the tablet or writing section C for threading through the slot 38 in the outer end of same, and then return-bent to pass around the arcuate edge 39 of said slot 38 and from thence pass upwardly and inwardly over the upper or writing surface of the platen 35 with the marginal side portions of the memo paper strip 22b passing or threading meanwhile through the guideways 41, and finally passing or threading the free terminal of said memo paper strip 22b beneath the transversely disposed leg portion 44 of the member 40, see Fig. 8, to thus complete the threading operation of the memo paper strip 22b through the holder, following which the telephone instrument T is placed or seated within the tray 26 of the section B, after which the telephone and memorandum paper holder is conditioned and ready for use.

The above described telephone holding section B having the rectangular tray 26 is furnished or supplied to the retail trade in various sizes, to thus accommodate the different sizes of rectangular telephone bases; as for example, a combination desk or hand set having a 5" x 7⅜" base; or a combination desk or hand set with one or more keys having a 5½" x 9" base, and so on and so forth. However, it should be here clearly borne in mind, that regardless of the size of the telephone holding sections B, the same sections A and C are employed therewith, so that any size of telephone holding section B is readily interchangeable for use with said sections A and C, and hence any size of telephone holding section may be rapidly replaced by a telephone holding section of any other size, as and when desired and found necessary.

Figure 12:
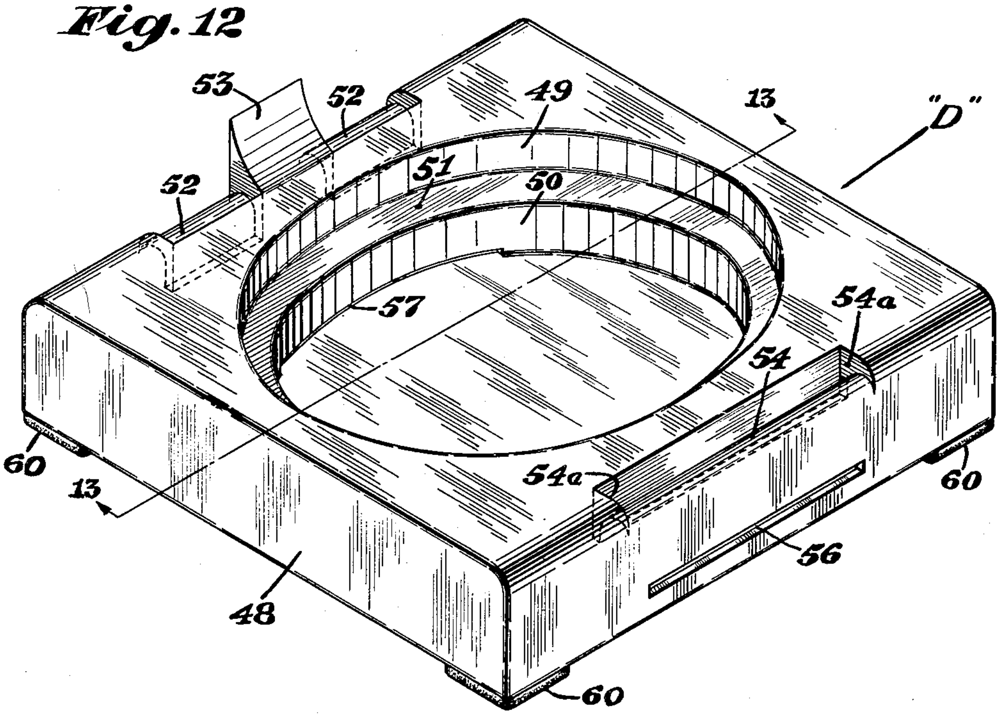
Fig. 12 is a perspective view of an interchangeable telephone holding section employable with the present sectional telephone and memorandum paper holder.
Figure 13:
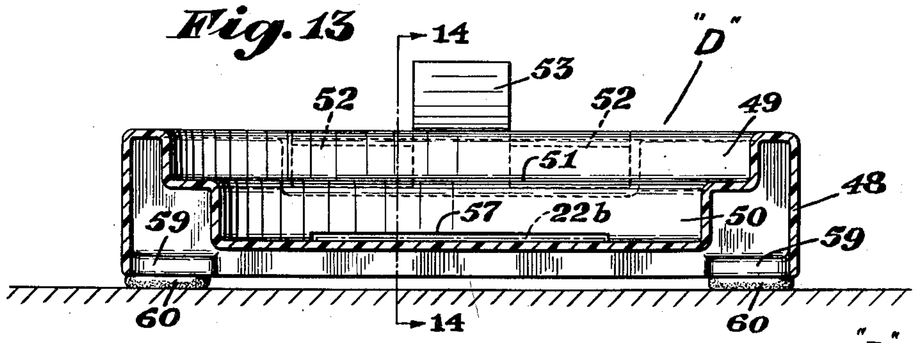
Fig. 13 is a transverse vertical section of the same taken on the line 13—13 of Fig. 12.
Figure 14:
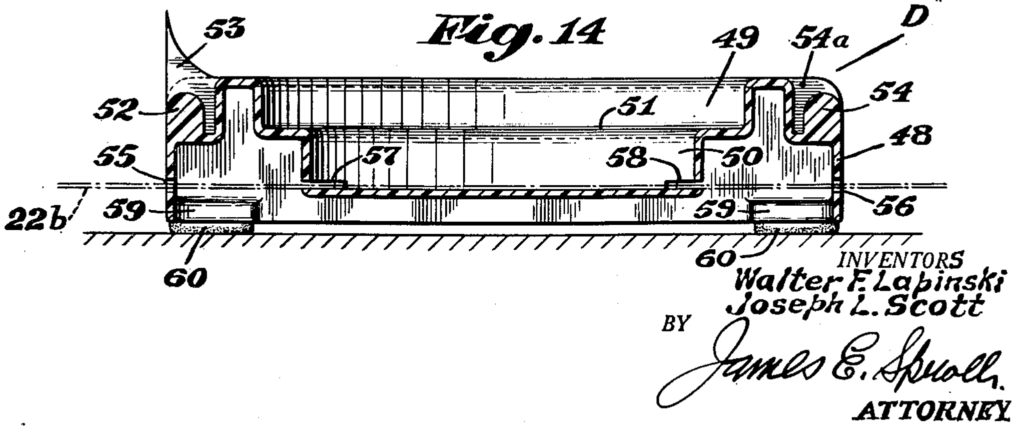
Fig. 14 is a longitudinal vertical section of the same taken on the line 14—14 of Fig. 13.

In addition to the foregoing, the present invention also contemplates providing telephone holding sections for accommodating telephone instruments having bases of a shape or shapes other than rectangular, such for example as that illustrated in Figs. 12 to 14, inclusive, of the drawings, wherein is shown a telephone holding section generally designated by the reference character D, which section is especially designed and particularly intended for accommodation of and use with telephone instruments having oval bases, and also for use with the memo paper roll holding section A and tablet or writing section C hereinbefore described, so that such telephone holding section D may be readily interchanged with and/or replaced by any of the various sizes of the rectangular type of telephone holding sections B, or conversely.

As now constructed, the telephone holding section D essentially consists of a square-shaped body or casing 48 having a centrally disposed oval recess 49 and a similarly shaped counter-recess formed therein, so that said recess and counter-recess conjointly form and provide within the body 48 a shoulder 51 for a purpose about to be described. The oval recess 49 is adapted to receive and accommodate a telephone instrument, not shown, having an oval base and the shoulder 51 functions to support said telephone instrument within the body 48 in an obvious manner, since, the padded bottom face of said oval base normally rests or seats upon the shoulder 51 when the telephone instrument is positioned within the holding section D.

Molded or formed in any desired manner within the upper edge of one end of the body 48 in spaced endwise relation are transversely disposed ribs 52 having semi-circular upper edges, which ribs are straddled by and interlock with the saddle lugs 24 of the memo paper roll holding section A previously described, when such section is operatively assembled with the telephone holding section D. The ribs 52 are separated by a centrally disposed and upwardly extending curvilinear lug 53 similarly molded or formed upon said body 48, which lug 53 is adapted to normally fit or seat within the recess 25 of said section A upon assembly of same with the section D, and functions when thus seated within said recess 25 to retain the section A against any lateral or sidewise movement relative to the section D.

Similarly molded or formed within the upper edge of the opposite end of the body 48 is a centrally disposed transverse rib 54 having a semi-circular upper edge, which rib is straddled by and interlocks with the saddle lug 36 of the tablet or writing section C upon assembly of the latter with the section D, and when thus straddling the rib 54 said saddle lug 36 snugly fits between the rib shoulders 54a to thereby retain the section C against lateral or sidewise movement relative to the section D.

To effect and permit passage of the memo paper strip 22b from end to end of the body 48 of the section D, the end walls of said body adjacent the lower edges of the same are provided with centrally and transversely disposed slots 55 and 56, respectively, also the side walls of the counter-recess 50 at or near the bottom wall of same and at opposite points therein and in alignment with the slots 55 and 56 are provided with slots 57 and 58, respectively, so that said memo paper strip may be rapidly and readily threaded through the section D and during passage therethrough may rest upon the bottom wall of said counter-recess 50, as shown by dot and dash lines in Figs. 13 and 14.

To prevent injury to or marring of desk tops or other supporting surfaces, the section D at the corners thereof are provided with triangular bosses 59 to which are bonded or cemented pads 60 of rubber, felt or the like.

The above described telephone holding section D is generally furnished or supplied to the retail trade having an oval telephone receiving recess 49 with a minor axis of five inches and a major axis of six inches, however, we desire to have it here understood, that D sections having other sizes of oval telephone receiving recesses are furnished or supplied, as when necessary and required.

In the present disclosure, we have elected to show and describe ribs and saddle lugs as the means for interlocking the sections A, B and C, and/or the sections A, D and C in longitudinally aligned and operative relation, however, we desire to have it here understood that such showing and description is merely illustrative, inasmuch as, other types of interlocking means may be effectively employed for the purpose of detachably and/or releasably interconnecting the sections A, B and C, and/or the sections A, D and C. It is also to be here understood, that, while we have shown and described the sections A, B and C, and/or the sections A, D and C as separable units, such units may if desired and deemed expedient be integrally connected to form and provide telephone and memorandum paper holders as one-piece units.

Having thus fully described our invention, what we claim as new and desire to secure by Letters Patent, is:

1. In a sectional telephone and memorandum paper holder, the combination comprising: a telephone holding section of a predetermined size and shape, a memo paper roll holding section, means for effecting releasable interlocking engagement of said roll holding section with said telephone holding section including means for preventing lateral movement therebetween, a tablet section, and means for effecting releasable interlocking engagement of said tablet section with said telephone holding section including means for preventing lateral movement therebetween.

2. In a sectional telephone and memorandum paper holder, the combination comprising: a telephone holding section of relatively shallow formation adapted to accommodate a telephone base of a specific size and shape, a memo paper roll holding section adaptable for releasable interlocking engagement with one end of said telephone holding section, and a tablet section having similar engagement with the opposite end of said telephone holding section.

3. In a sectional telephone and memorandum holder, the combination comprising: a telephone holding section having section engageable means upon each end thereof and being adapted to accommodate a telephone base of a specific size and shape, a memo paper roll holding section having complemental means upon one side thereof adapted to releasably engage and interlock with the section engageable means on one end of said telephone holding section, and a tablet section having complemental means upon one end thereof adapted to releasably engage and interlock with the section engageable means on the opposite end of said telephone holding section.

4. In a sectional telephone and memorandum holder, the combination comprising: a telephone holding section having rib formations upon opposite ends thereof and being adapted to accommodate a telephone base of specific size and shape, a memo paper roll holding section having a saddle lug on the inner side wall thereof adapted to straddle and interlock with the rib formation on one end of said telephone holding section for effecting a releasable interlocking connection between said telephone and roll holding sections, and a tablet section having a saddle lug on the inner end thereof adapted to straddle and interlock with the rib formation on the opposite end of said telephone holding section for effecting a releasable straddling and interlocking connection between said telephone holding and tablet sections.

5. In a sectional telephone and memorandum holder, the combination comprising: a telephone holding section having upon one end thereof a pair of endwise spaced ribs and an upright lug intermediate said ribs and upon the opposite end thereof a median rib, said telephone holding section being adapted to accommodate a telephone base of a specific size and shape, a memo paper roll holding section having a pair of saddle lugs disposed upon the inner side walls thereof in endwise spaced relation to provide a recess therebetween, said saddle lugs being adapted to straddle and releasably interlock with the pair of ribs on said first mentioned end of the telephone holding section, and said recess being adapted meanwhile to receive and accommodate the upright lug on the same end of said telephone holding section, and a tablet section having a saddle lug on the inner end thereof adapted to straddle and releasably interlock with the median rib on the opposite end of said telephone holding section.

6. In a sectional telephone and memorandum paper holder, the combination comprising: a telephone holding section having aligned median slots formed within the lower marginal portions of the end walls thereof and being adapted to accommodate a telephone base of a specific size and shape, a memo paper roll holding section releasably engageable with one end of said telephone holding section, a tablet section similarly engageable with the opposite end of said telephone holding section, said tablet section having an inclined platen including memo paper guide means, and a roll of memo paper rotatively mounted within said roll holding section wherefrom a memo paper strip is withdrawn to pass lengthwise through the median slots in the lower marginal portions of the telephone holding section currently in use and thence beneath said tablet section and thence over the inclined platen of same with the marginal portions of said paper strip passing meanwhile through the guide means carried by said platen.

WALTER F. LAPINSKI.
JOSEPH L. SCOTT.

References Cited in the file of this patent

UNITED STATES PATENTS

| Number | Name | Date |
|---|---|---|
| 1,390,705 | Hattersley | Sept. 13, 1921 |
| 1,612,258 | Broadwin | Dec. 28, 1926 |
| 2,239,679 | Jones | Apr. 29, 1941 |
| 2,511,771 | Fagan | June 13, 1950 |
| 2,592,066 | Pratt | Apr. 8, 1952 |